US006552335B1

(12) United States Patent
Guo et al.

(10) Patent No.: US 6,552,335 B1
(45) Date of Patent: Apr. 22, 2003

(54) SDIFA MASS SPECTROMETRY

(75) Inventors: Baochuan Guo, Solon, OH (US); Shenyi Wang, Dover, DE (US)

(73) Assignee: Cleveland State University, Cleveland, OH (US)

( * ) Notice: Subject to any disclaimer, the term of this patent is extended or adjusted under 35 U.S.C. 154(b) by 0 days.

(21) Appl. No.: 09/592,407

(22) Filed: Jun. 13, 2000

(51) Int. Cl.[7] .......................... B01D 59/44; H01J 49/00
(52) U.S. Cl. ....................................... 250/287; 250/282
(58) Field of Search ................................ 250/281, 282, 250/286, 287

(56) References Cited

U.S. PATENT DOCUMENTS

| | | | | |
|---|---|---|---|---|
| 5,625,184 A | * | 4/1997 | Vestal et al. | 250/287 |
| 5,627,369 A | * | 5/1997 | Vestal et al. | 250/287 |
| 5,654,543 A | * | 8/1997 | Li | 250/287 |
| 5,760,393 A | | 6/1998 | Vestal et al. | 250/282 |
| 5,872,003 A | | 2/1999 | Köster | 435/283.1 |

OTHER PUBLICATIONS

W.C. Wiley and I.H. McLaren, "Time–of–Flight Mass Spectrometer with Improved Resolution," *The Review of Scientific Instruments,* pp. 1150–1157, 1955.

R.S. Brown and J. J. Lennon, "Mass Resolution Improvement by Incorporation of Pulsed Ion Extraction . . . ," *Analytical Chemistry,* vol. 67, pp. 1998–2003, 1995.

R.M. Whittal and L. Li, "High–Resolution Matrix–Assisted Laser Description/Ionization in a Linear Time–of–Flight Mass Spectrometer," *Analytical Chemistry,* vol. 67, pp. 1950–1954, 1995.

M.L. Vestal et al., "Delayed Extraction Matrix–Assisted Laser Desorption Time–of–Flight Mass Spectrometry," *Rapid Communications in Mass Spectrometry,* vol. 9, pp. 1044–1050, 1995.

S.M. Colby and J.P. Reilly, "Space—Velocity Correlation Focusing," *Analytical Chemistry,* vol. 68, pp. 1419–1428, 1996.

B. Phimister, *Nature Genetics Supplement,* vol. 21, Jan. 1999.

T.J. Griffin et al., "Genetic Analysis by Peptide Nucleic Acid Affinity MALDI–TOF Mass Spectrometry," *Nature Biotechnology,* vol. 15, pp. 1368–1372, 1997.

P.L. Ross et al., "Discrimination of Single–Nucleotide Polymorphisms in Human DNA Using Peptide Nucleic Acid Probes Detected by MALDI–TOF Mass Spectrometry," *Analytical Chemistry,* vol. 69, pp. 4197–4202, 1997.

P. Jiang–Baucom et al., "DNA Typing of Human Leukocyte Antigen Sequence Polymorphisms in by Peptide Nucleic Acid Probes and MALDI–TOF Mass Spectrometry," *Analytical Chemistry,* vol. 69, pp. 4894–4898, 1997.

D.P. Little et al., "Identification of Apolipoprotein E. Polymorphisms Using Temperature Cycled Printer Oligo Base Extension and Mass Spectrometry," *Eur J Clin Chem Clin Biochem,* pp. 545–458, 1997.

D.P. Little et al., "Detection of RET Proto–Oncogene Codon 634 Mutations Using Mass Spectrometry."

A. Braun et al., "Detecting CFTR Gene Mutations by Using Primer Oligo Base Extension and Mass Spectrometry," *Clinical Chemistry,* pp. 1151–1158, 1997.

"Competitive Oligonucleotide Single–Base Extension Combined with Mass Spectrometric Detection for Mutation Screening," *BioTechniques,* vol. 23, pp. 710–714, 1997.

(List continued on next page.)

*Primary Examiner*—Bruce Anderson
(74) *Attorney, Agent, or Firm*—Calfee, Halter & Griswold, LLP

(57) ABSTRACT

The mass resolution and accuracy of delayed extraction matrix assisted desorption/ionization time of flight mass spectrometry is improved by spatially separating the electric field used for driving extraction/acceleration from the sample being analyzed.

32 Claims, 7 Drawing Sheets

OTHER PUBLICATIONS

D.P. Little et al., "Spectrometry from Miniaturized Arrays for Full Comparative DNA Analysis," *Nature Medicine,* vol. 3, pp. 1413–1416.

A. Braun, "Improved Analysis of Microssatellites Using Mass Spectrometry," *Genomics,* vol. 46, pp. 18–53, 1997.

L.A. Haff and I.P. Smirnov, "Single–Nucleotide Polymorphism Identification Assays Using a Thermostable DNA Polymerase and Delayed Extraction MALDI–TOF Mass Spectrometry," *Genome Research,* pp. 378–388.

L.A. Haff and I.P. Smirnov, "Multiplex Genotyping of PCR Products with Mass Tag–Labeled Primers," *Nucleic Acids Research,* vol. 25, pp. 3749–3750, 1997.

P. Ross et al., "High Level Multiplex Genotyping by MALDI–TOF Mass Spectrometry," *Nature Biotechnology,* vol. 16, pp. 1347–1351, 1998.

P. Ross et al., "Why MALDI–TOF Mass Spectrometry is the Method of Choice for Anlysis of Single Nucleotide Polymorphisms," PE Biosystems.

Z. Fei et al., "MALDI–TOF Mass Spectrometric Typing of Single Nucleotide Polymorphisms with Mass–Tagged ddNTPs," *Nucleic Acids Research,* vol. 26, pp. 2827–2828.

Z. Fei and L.M. Smith, "Analysis of Single Nucleotide Polymorphisms in Human DNA by Single–Base Extension & MALDI–TOF Mass Spectrometry," Dept. of Chemistry, Univ. of Wisconsin.

J.M. Butler et al., "SNP Determination Using Cleavable Primers and Time–of–Flight Mass Spectrometry," GeneTrace Systems Inc.

J. Li et al., "Single Nucleotide Polymorphism Determination Using Primer Extension and Time–of–Flight Mass Spectrometry," *Electrophoresis,* vol. 20, pp. 1258–1265, 1999.

B.H. Wang et al., "High Throughput Variance Discovery by MALDI–TOF Mass Spectrometry," Variagenics, Inc.

I.G. Gut et al., "'Charge Tagging' DNA?" Max–Planck–Institute for Molecular Genetics (Germany).

H. Lehrach and I.G. Gut, "Oligofingerprinting with PNAs and MALDI," Max–Planck–Institute for Molecular Genetics (Germany).

T.J. Griffin et al., "Direct Genetic Analysis by Matrix–Assisted Laser Desorption/Ionization mass Spectrometry," *Proc. Nat'l. Acad. Sci. USA,* vol. 96, pp. 6301–6306, 1999.

X. Chen et al., "Stable–Isotope–Assisted MALDI–TOF Mass Spectrometry for Accurate Determination of Nucleotide Compositions of PCR Products," *Analytical Chemistry,* vol. 71, pp. 3118–3125, 1999.

P. Juhasz et al., "Applications of Delayed Extraction matrix –Assisted Laser Desorption Ionization Time–of–Flight Mass Spectrometry to Oligonucleotide Analysis," *Analytical Chemistry,* vol. 68, pp. 941–946, 1996.

Y. Zhu et al., "Improved Resolution in the Detection of Oligonucleotides up to 60–mers in Matrix–Assisted Laser Desorption/Ionization Time–of–Flight . . . ," *Rapid Communications in Mass Spectrometry,* vol. 11, pp. 987–992, 1997.

X. Tong and L.M. Smith, "Solid–Phase method for the Purification of DNA Sequencing Reactions," *Analytical Chemistry,* vol. 64, pp. 2672–2677, 1992.

K.C. Hung et al., "Use of Poly(tetrafluoroethylene)s as a Sample Support for the MALDI–TOF Analysis of DNA and Proteins," *Analytical Chemistry,* vol. 71, pp. 518–521, 1999.

U. Bahr et al., "Delayed Extraction Time–of–Flight MALDI Mass Spectrometry of Proteins Above 25000 Da," *Journal of Mass Spectrometry,* vol. 32, pp. 1111–1116, 1997.

K.C. Hung et al., "Use of Paraffin Wax Film in MALDI–TOF Analysis of DNA," *Analytical Chemistry,* vol. 70, pp. 3088–3093, 1998.

Y. Liu et al., "Rapid Screening of Genetic Polymorphisms Using Buccal Cell DNA with Detection by Matrix–Assisted Laser Desorption/Ionization Mass Spectrometry," *Rapid Communications in Mass Spectrometry,* vol. 9, pp. 735–743, 1995.

J. Bal et al., "Matrix–Assisted Laser Desorption/Ionization Using an Active Perflurosulfonated Ionomer Film Substrate," *Analytical Chemistry,* vol. 66, pp. 3423–3430, 1994.

A.A. Puretzky and D.B. Geohegan, "Gas–Phase Diagnostics and LIF–Imaging of 3–Hydroxypicolinic Acid Maldi–Matrix Plumes," *Chemical Physics Letters,* pp. 425–432, 1998.

K.J. Wu et al., "Time–of–Flight Mass Spectrometry of Underivatized Single–Stranded DNA Oligomers by Matrix –Assisted Laser Desorption," *Analytical Chemistry,* vol. 66, pp. 1637–1645, 1994.

* cited by examiner

SDIFA MASS SPECTROMETRY

FIELD OF INVENTION

The present invention relates to mass spectrometry. In particular, the present invention relates to improvements in matrix assisted laser desorption ionization time of flight mass spectrometry.

BACKGROUND

With the advent of delayed extraction (DE) or time-lag energy focusing technology, matrix assisted laser desorption ionization time of flight mass spectrometry (MALDI-TOF) has enjoyed renewed interest in analyzing samples of biological origin.

In MALDI-TOF, ions of a sample to be analyzed, which are generated and desorbed by laser or other ionization source, are sensed by a detector remote from the sample. By measuring the time it takes the generated ions to travel to the detector, different ions can be separated from one another according to their mass-to-charge ratios. In DE, the sample holder on which the sample is mounted is pulsed with an electric potential at a predetermined time after ionization. As a result, an electric field is set up which extracts sample ions from the ion plume and accelerates the extracted ions towards the detector. The overall result is that accuracy and sensitivity of the analysis is enhanced. See U.S. Pat. No. 5,760,393, the disclosure of which is incorporated herein by reference.

A major advantage of MALDI-TOF is that multiple samples can be analyzed in a single run of the machine. For example, some commercially-available MALDI-TOF mass spectrometers use sample holders accommodating up to 100 different samples arranged, for example, in a 10×10 grid. The machine can be programmed to sequentially analyze each of these samples in order, thereby allowing the machine to automatically perform 100 different analyses in a single run of the machine.

A current objective of modern science is to completely sequence the human genome. An important part of this effort will be analyzing single nucleotide polymorphisms (SNP's), the most common genetic variation in the human genome pool. Because of its sensitivity and ability of analyzing multiple samples in a high-throughput manner, MALDI-TOF appears to be one of the best technologies for this effort.

However, current MALDI-TOF technology is still limited for this purpose. For example, mass differences between nucleotides can be as little as 9 Da (the difference between the A and T heterozygotes), and current DE-modified MALDI-TOF technology cannot resolve this difference unambiguously. See Fei et al. *Nucleic Acids Research*, Vol. 26, Page 2827, 1998. Furthermore, multiplex genotyping of SNP's requires the very best resolution over a broad mass range, while current DE-modified MALDI-TOF technology provides good resolution only in a narrow mass range, at least when using a single set of focusing parameters (i.e. in a single run of an automated machine). See Juhasz et al., *Analytical Chemistry*, Vol. 68, Page 941, 1999.

Still another disadvantage of current DE-modified MALDI-TOF technology relates to sample substrates. It has been demonstrated that in many cases, MALDI sample substrates made from dielectric materials provide better sensitivity than those made from metals. Hence, samples in MALDI-TOF analyses are often mounted on a dielectric sheet carried by the sample holder, rather than directly on the sample holder itself. To this end, it has also been proposed to directly analyze proteins separated by 2-D gels by attaching the gels or membranes directly to the MALDI sample holder. See Ogorzalek Loo et al., *Electrophoresis*, Vol. 18, page 382, 1997. However, such dielectric sheets also cause localized variations in electrical potential from sample to sample, as well as from spot to spot on the same sample, during machine operation. Although the addition of internal standards or reference chemicals for calibration purposes can overcome this problem to a certain degree, these variations make it difficult to generate high-quality spectra by multiple data acquisitions.

Accordingly, it is an object of the present invention to provide a new approach to MALDI-TOF mass spectrometry which provides better accuracy, sensitivity and resolution than current technology and which further allows easier data acquisition and other advantages compared with past practice.

SUMMARY OF THE INVENTION

This and other objects are accomplished by the present invention which is based on the discovery that improved MALDI-TOF mass spectrometry can be achieved by spatially separating the electric field used for extraction/acceleration from the location of the sample in the machine. In particular, it has been found that by applying the electrical potential used for extraction/acceleration to a focusing element spaced apart from the sample, rather than to the sample itself or the sample holder carrying the sample, superior accuracy and resolution can be achieved.

Accordingly, the present invention provides new technology that can substantially improve the performance of delayed extraction MALDI-TOF mass spectrometry in analyzing oligonucleotide and other biomolecules. Unlike conventional delayed extraction MALDI-TOF, this new approach separates desorption/ionization from acceleration. Hence, the acronym SDIFA. With SDIFA, isotope-limited resolution can be obtained for oligonucleotides of up to 62 mers, and multiple T/A heterozygote samples in the mass range of 5200–7800 Da can be clearly identified using a single set of focusing parameters, i.e. in a single run of the machine. Moreover, compared with conventional delayed extraction MALDI-TOF mass spectrometry, the performance of SDIFA is more stable and less dependent on the experimental conditions such as laser power, sample spots, delay times and the extraction field. The result is that data acquisition is both easier and more reproducible.

Thus, the present invention provides a new process and apparatus for carrying out MALDI-TOF mass spectrometry in which the electric field for achieving extraction of sample ions from the ion plume created by sample ionization, and acceleration of those ions towards the detector of the spectrometer, is spatially separated from the sample.

In particular the present invention provides a new process and apparatus for carrying out MALDI-TOF mass spectrometry in which the electric potential for achieving extraction and acceleration of sample ions is applied to a focusing element of the device spaced apart from the sample holder, rather than the sample holder or sample itself as done in past practice.

In accordance with a further aspect of the invention, it has also been found that the superior performance of the inventive SDIFA technology allows gel sheets and other separation (adsorption) media traditionally used for physically separating closely-related compounds to be directly used as targets in the mass spectrometric analysis. The traditional approach for analyzing multiple closely-related compounds such as occurs in protein analysis, for example, is to (1) physically separate the compounds by adsorption, (2) extract each compound individually from the adsorption medium, (3) deposit each extracted compound on a common sample holder, and (4) separately analyze each compound. Because of the superior performance of the inventive SDIFA technology, however, it has been found that high quality analytical results can be obtained by directly using the adsorption medium as the analysis target. This approach totally eliminates steps (2) and (3) in the above protocol, thereby vastly simplifying automated data acquisition.

Thus the present invention also provides an improvement in processes for automatic mass spectrometric analysis of multiple samples recovered on a common separation medium, the improvement wherein the common separation medium is directly used as the target in a mass spectrometric analysis carried out using the SDIFA technology of the present invention.

BRIEF DESCRIPTION OF THE DRAWINGS

The present invention may be more readily understood by reference to the following drawings wherein.

DETAILED DESCRIPTION

Figure 1:
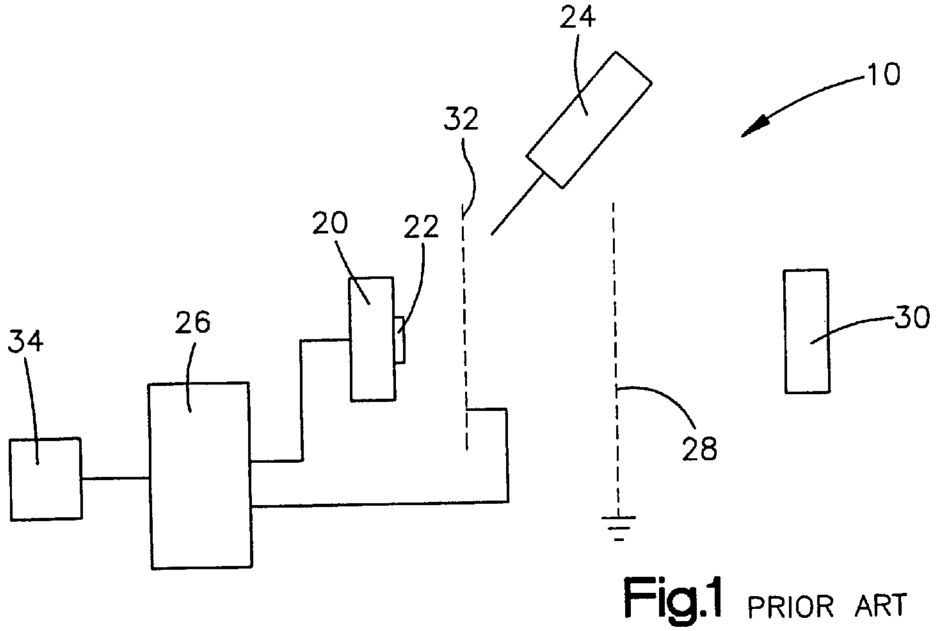
Fig.1 PRIOR ART
FIG. 1 is a schematic illustration showing some of the components of a conventional mass spectrometer adapted to carry out conventional delayed extraction MALDI-TOF mass spectrometry.

As shown in FIG. 1, a mass spectrometer capable of carrying out conventional delayed extraction MALDI-TOF analysis is generally indicated at 10. This device includes a sample holder 20 carrying sample 22 and an ionization source 24 such as a pulsed laser capable of irradiating sample 22 with sufficient energy to desorb and ionize a portion of the sample. A power system 26 raises sample holder 20 and sample 22 to an elevated electrical potential with respect to a reference focusing element 28, which may take the form of a grid, electrostatic lens or other similar device, and which is typically maintained at a reference or ground potential. An electrical field is therefore set up between sample holder 20 and reference focusing element 28, which serves to extract ions from the particle plume created by irradiation and accelerate these ions towards a detector 30. Detector 30 senses and records the relative number of ions reaching the detector as a function of time, thereby allowing the machine to separate the different ions generated according to their mass-to-charge ratio, which in turn allows information concerning the composition and other features of the sample to be determined.

In conventional delayed extraction MALDI-TOF mass spectrometry, the mass spectrometer is provided with an additional focusing electrode 32, which is spaced from sample 22 by a suitable distance, typically 0.1–0.3 inch, and which is maintained at the same elevated electrical potential as sample holder 20 by power system 26. In addition, power system 26 is adapted to raise the electrical potential of sample holder 20 and sample 22 to a higher value, as compared with that applied to focusing electrode 32, for example 23 kV instead of 20 kV, at a predetermined time after sample 22 is irradiated by ionization source 24. Typically, a control system 34 is also provided for controlling power source 26.

In operation, sample 22 is irradiated with a pulse of ionizing radiation during an initial phase of operation in which sample holder 20 and focusing element 32 are maintained at the same electrical potential. During this initial phase of operation, the plume of desorbed particles produced by sample irradiation expands in the area between sample holder 20 and focusing element 32, which is a field free zone (i.e. a zone free of electric field) since the electrical potentials of sample holder 20 and focusing element 32 are the same. Then, at a predetermined time after sample irradiation, control system 34 causes a pulsed increase in the electrical potential of sample holder 20, while maintaining the electrical potential of focusing element 32 unchanged. This momentary increase in the electrical potential of sample holder 20 creates an electric field between the sample holder and focusing element 32, which in turn extracts ions from the plume and accelerates these ions towards detector 30. By delaying extraction/acceleration in this manner, it has been found that the overall accuracy and sensitivity of the machine can be significantly enhanced.

Figure 2A:
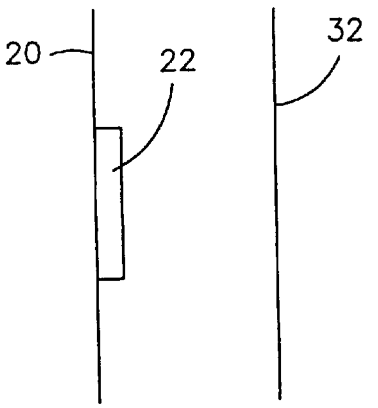
Fig.2A PRIOR ART
FIGS. 2*a* and 2*b* are schematic illustrations of the apparatus of FIG. 1 showing the relationship between the focusing elements and the ion plume created during operation of this device.
Figure 2B:
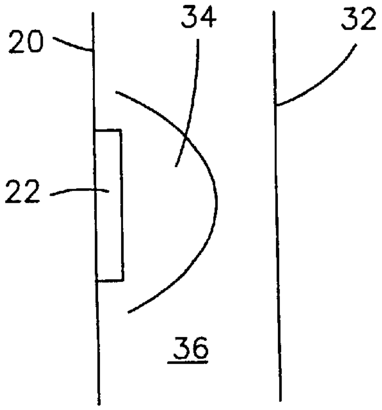
Fig.2B PRIOR ART

FIGS. 2*a* and 2*b* further illustrate the operation of the mass spectrometer of FIG. 1 using conventional delayed extraction MALDI-TOP mass spectroscopy. Immediately before sample irradiation, as shown in FIG. 2*a*, sample 22 is held on (or with respect to) sample holder 20, with the electrical potentials on both sample holder 20 and focusing element 32 being the same. Ionization source 24 then irradiates sample 22 with a pulse of ionizing radiation which causes some of the sample to desorb into the gas phase and a portion of the desorbed particles to ionize. At some predetermined time after ionization, typically several hundred nanoseconds, the desorbed particles have expanded in the form of a plume 34 in the field free zone 36 between sample holder 20 and focusing electrode 32. See FIG. 2B. At this time, control system 34 triggers power system 26 into increasing the electrical potential of sample holder 20 from 20 kV to 23 kV, for example, so that a significant electrical field is established in zone 36 between sample holder 20 and focusing electrode 32. This electrical field extracts ions from plume 34 and accelerates these ions towards detector 30. This delayed extraction/acceleration effect significantly enhances the overall accuracy and sensitivity of the machine, as indicated above.

Figure 3:
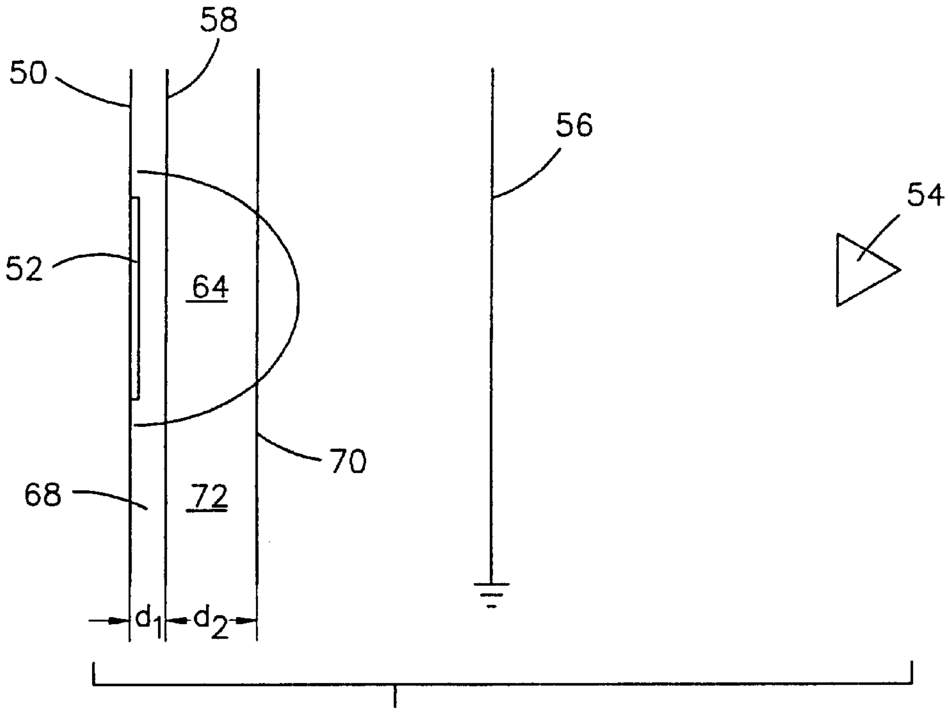
FIG. 3 schematic illustration similar to FIG. 2*b* illustrating the principles of the present invention.

The present invention departs from this approach in that, according to the present invention, the electrical field used for extraction/acceleration is spatially separated from the sample. This is illustrated in FIG. 3, which shows the inventive mass spectrometer to include a sample holder 50 for carrying a sample 52 to be analyzed, a detector 54 for sensing ions derived from the sample and a reference focusing element 56 spaced between the sample and the detector and maintained at a convenient reference potential such as ground or the like. In addition, a first focusing element 58 which may be a grid, electrostatic lens or other device for establishing an electrical potential while allowing free passage of ions is provided spaced apart from the sample holder between the sample holder and reference focusing element 56. Focusing element 58 is typically 0.1–0.3 cm from the sample holder 50, although greater or lesser distances can be employed, as further described below. A power system (not shown) is provided for imparting electrical potentials to sample holder 50 and first focusing element 58, while a control system (also not shown) is provided for controlling operation of the power system.

To achieve spatial separation of the extraction/acceleration electric field from the sample in accordance with the present invention, the increase in electrical potential used for driving extraction/acceleration is applied to first focusing element 58 rather than to sample holder 50 as done in conventional technology. In addition, application of this increased potential is delayed until a substantial portion of ion plume 64 has passed first focusing element 58 towards detector 54. See FIG. 3. Accordingly, when an increase in electrical potential is applied to first focusing element 58, the electric field for driving extraction/acceleration is set up between first focusing element 58 and reference electrode 56, remote from sample 52. Furthermore, a second electric field acting in the opposite direction is set up between focusing element 58 and sample holder 50, as the electrical potential of sample holder 50 is preferably left unchanged. This "reverse" electric field drives ions in first focusing region 68 between focusing element 58 and sample holder 50 back towards sample holder 50, thereby prevented these ions from reaching detector 54. The net effect is that the accuracy of analysis is enhanced even further, since the slowest-moving ions in the plume have been eliminated.

In accordance with a preferred embodiment, the inventive mass spectrometer is provided with a second focusing element 70. See FIG. 3. Second focusing element 70 is arranged between first focusing element 58 and reference focusing element 56, second focusing element 70 and first focusing element 58 together defining between them second focusing region 72. As shown in FIG. 3, second focusing element 70 is spaced from first focusing element 58 by a sufficient distance so that a significant but not substantial portion of plume 64 passes second focusing element when extraction/acceleration is initiated by application of a potential increase to first focusing element 58. Normally, second focusing element will be spaced 0.1 to 1.0, more typically 0.15 to 0.5, even more typically 0.2 to 0.4 cm. from first focusing element 58, although greater and lesser distances can be employed as further discussed below. Preferably, second focusing element 70 is maintained at the essentially the same electrical potential as sample holder 50 throughout operation of the machine.

By using second focusing element 70 in this way, it has been found that the resolution made possible by the inventive SDIFA technology can be enhanced even further.

In conventional delayed extraction MALDI-TOF mass spectrometry, the electric field created upon pulsing, i.e. the electric field created in region 36 in FIG. 2B, imparts additional energy to the ions in plume 34. Those ions which have slower initial velocities ("slower ions") receive more energy than those having higher initial velocities ("faster ions"), because the slower ions are nearer sample holder 20 and hence under the influence of this electric field longer before passing out of this field. The net effect is that the time window over which the ions in the plume reach detector 30 is condensed, thereby "focusing" the ions in the plume into a shorter and hence more concentrated and intense signal.

By using second focusing element 70, a similar "focusing" effect is achieved in the inventive SDIFA technology. However, because pulsing is not initiated until the fastest ions in the plume have passed focusing element 70, this focusing effect is restricted to the portion or "slice" of the ion plume in region 72 between first focusing element 58 and second focusing element 70. Because the ions in this plume slice already have a relatively compact initial velocity distribution, the net effect is that the time window over which these ions reach detector 54 is even more compressed. As a result, an even more intense, better focused signal is created from these ions.

The fastest moving ions in the plume, which have already passed second focusing element 70 when pulsing is initiated, also reach detector 54. However, because these ions are not subjected to the pulsed electric field, they are not focused and thereby their initial velocity distribution creates a large flight time distribution in terms of their impacting detector 54. In other words, the time window over which these ions impact detector 54 is large. Accordingly, the signal created by these ions basically devolves down to "noise" as compared with the more intense signal created by the focused ions in the plume slice of region 72. This effect, when coupled with signal enhancing effect derived from rejecting the slow moving ions as discussed above, is that the overall resolution and accuracy of the signal obtained is dramatically increased.

The inventive mass spectrometer of FIG. 3 is operated in essentially the same way as conventional delayed extraction MALDI-TOF mass spectrometers. That is, the operation of the device is divided essentially into two phases, a desorption/ionization phase and a delayed extraction/acceleration phase. In the desorption/ionization phase, a pulse of laser or other pulsed source irradiates the sample in a field free zone so as to produce a particle plume containing ions of the sample to be analyzed and a delayed extraction/acceleration phase in which ions are extracted from the plume and accelerated toward the detector. However, in accordance with the present invention, the increase in electric potential for driving extraction/acceleration is applied to the focusing element proximate the sample, first focusing element 58 in FIG. 3, rather than sample holder 50. In addition, the time delay between desorption/ionization and extraction/acceleration is increased compared with conventional practice so that a substantial portion of plume 64 passes first focusing element 58 while a significant portion of plume 64 passes second focusing element 70 when extraction/acceleration is initiated. As a result, the slow moving ions of plume 64 in region 68 and the fast moving ions of plume 64 having passed second focusing element 70 are effectively eliminated from the analysis provided by the machine. In addition, the remaining ions in the plume, those in region 72, are compacted together as they are accelerated toward detector 54. The result of these combined effects is that the signal achieved has greater accuracy and resolution than possible in the past, since velocity focusing has been restricted to only those ions of plume 64 which already have a smaller initial velocity distribution before extraction/acceleration is started.

As indicated above, a substantial portion of plume 64 passes first focusing element 58 while a significant portion of the plume passes second focusing element 70 when extraction/acceleration is initiated. In this context, "substantial" means enough of plume 64 passes first focusing element 58 so that a discernible improvement in accuracy is provided by the machine as compared to an otherwise identical machine constructed and operated using conventional delayed extraction MALDI-TOF mass spectrometry as described in connection with FIG. 1. Similarly, "significant" in this context means a noticeable improvement in accuracy is provided to an otherwise identical analysis carried out with extraction/acceleration being initiated before plume 64 reaches second focusing element 70.

Determining whether a "substantial" amount of plume 64 has passed first focusing element 58 and whether a "significant" amount of plume 64 has passed second focusing element 70 is basically done by trial and error so as to achieve an acceptable and preferably optimal focusing condition, as reflected by the resolution achieved. This is the same approach used for selecting particular voltage and spacing values in conventional delayed extraction MALDI-TOF mass spectrometry and hence easily accomplished by those skilled in this technology.

Suitable time delays between sample irradiation and initiation of extraction/acceleration in carrying out the inventive SDIFA technology are normally about 2.5 to 10, more typically about 3 to 6, even more typically 3.5 to 5, microseconds. This is considerably longer than the normal time delay used in conventional delayed extraction MALDI-TOF mass spectrometry, which is on the order of several hundred nanoseconds. These delay times, as well as the plate spacings and voltages given elsewhere, however, are exemplary only, as similar results can be obtained with widely varying combinations of these variables. In any event, those skilled in the art should have no difficulty in selecting appropriate time delays, element spacings and other operating parameters necessary to adopt the present invention to specific applications through routine experimentation based on the above discussion and the following working examples.

Figure 4:
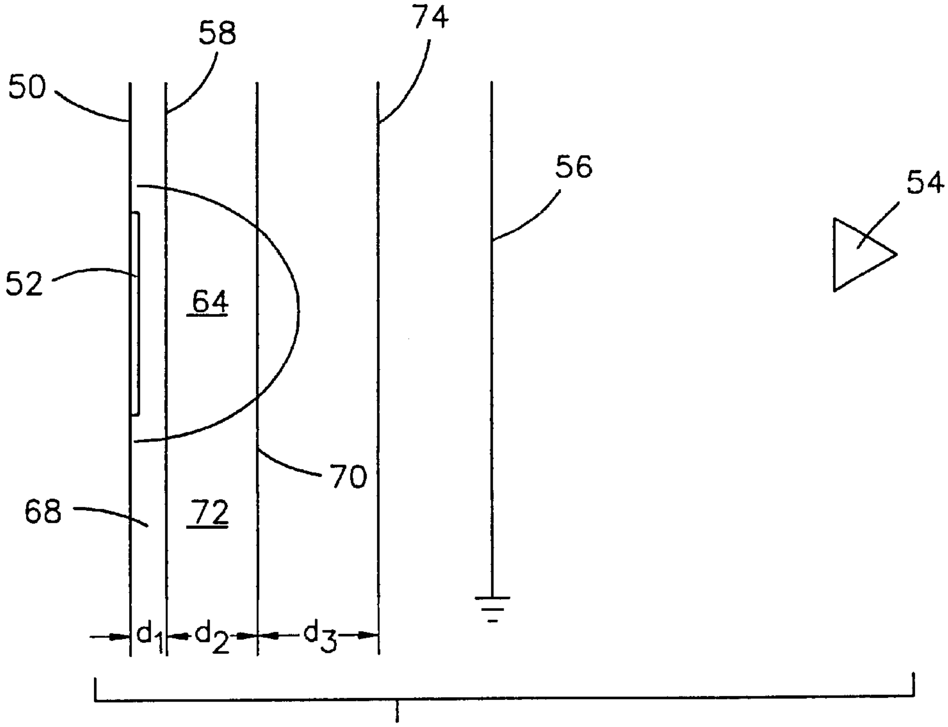
FIG. 4 is a schematic illustration similar to FIG. 3 illustrating an additional embodiment of the present invention.

Still another desirable embodiment of the invention is illustrated in FIG. 4 in which like reference numbers refer to like components. In this embodiment, third focusing element 74 is provided between second focusing element 70 and reference focusing element 56, third focusing element 74 also being connected to the power system (not shown). The spacing resolution R provided by a focusing system used in mass spectrometers of the type described above is given by the formula:

$$R\alpha\left(\frac{S}{\Delta S}\right)^2$$

where

S=the length of the first electric field driving ion acceleration

ΔS=the plume size in this electric field

In the embodiment of FIG. 3, both S and ΔS correspond to distance $d_2$ in FIG. 3. As a result, spacing resolution is less than ideal. In accordance this embodiment of the present invention, however, third focusing element 74 is provided and maintained at an electrical potential less than that of second focusing element 70 but more than that of reference focusing element 56. Preferably, third focusing element 74 is maintained at an electrical potential such that an essentially uniform (i.e. uniform or nearly uniform) electrical field is established between the first focusing element 58 and third focusing element 74. By "uniform or nearly uniform electrical field" is meant that there is an essentially linear drop in electrical potential between the first and third focusing elements. By this means, the analysis resolution provided by the machine is even better because the first acceleration electrical field has been expanded to extend from first focusing element 58 to third focusing element 74. Hence S in the above formula is considerably bigger than ΔS, since S is now represented by $d_2+d_3$ (FIG. 4) while ΔS correspond to distance $d_2$ in FIG. 4.

From the foregoing, it can be seen that significant enhancement of the resolution provided by delayed extraction MALDI-TOF mass spectrometry can be achieved by imparting the "increased" or "larger" or "greater" electrical potential used for driving extraction/acceleration to a focusing element spaced apart from the sample and/or sample holder rather than to the sample or sample holder itself. In this context, "increased" or "larger" or "greater" means that the absolute value of the potential of the focusing element is greater than the absolute value of the electric potential at the sample. Similarly, "less" or "smaller" means that the absolute value of the potential of the focusing element is less than the absolute value of the electric potential at the sample. In conventional MALDI-TOF as well as the present invention, the polarity of the electrical potentials applied to the sample and focusing elements is the same as the charge of the ions. That is, positive electrical potentials are applied to the sample holder and the focusing elements if the ions produced are positively charged, and conversely. Therefore, when carrying out the present invention in a mode in which positively charged ions are produced, a "larger" electrical potential on the first focusing element means that this electrical potential is greater than the electrical potential on the sample, +25 kV vs. +20 kV, for example. In the same way, a "larger" electrical potential on the first focusing element when negatively charged ions are produced means that the this electrical potential is less than ground by a greater amount than the electrical potential on the sample, −25 kV vs. −20 kV, for example. In both cases, the absolute value of the electrical potential on the first focusing element, 25 kV, is greater than the absolute value of the electrical potential on the sample, 20 kV, for example.

As indicated above, the primary reason why the inventive mass spectrometer is capable of providing better analysis resolution relative to conventional delayed extraction MALDI-TOF mass spectrometry is that velocity focusing is restricted to the ions in intermediate region 72 of plume 64, rather than all ions in the plume. However, a further reason why better resolution is achieved is that the time delay between desorption/ionization and extraction/acceleration is considerably greater, 3 microseconds versus 500 nanoseconds, for example. This difference allows plume 64 to expand to a much larger size than in conventional practice, which in turn significantly reduces plume density. Reduced plume density results in fewer inter-particle collisions after ion extraction/acceleration, which significantly increase resolution. The net effect is less collisions and better resolution. In addition, the instrument performance is less sensitive to laser power, thereby allowing greater ionization power without adversely effecting resolution to a significant degree A further advantage of the present invention relates to analyses carried out with a dielectric sample substrate. In conventional delayed extraction MALDI-TOF mass spectrometry, variations in electric potential across the same sample, or between multiple samples on the same sample holder, can lead to variations in result when dielectric materials are used as the sample substrate. As a result, the spectrum quality and analysis accuracy are reduced especially when automated data acquisition is performed. This becomes less problematic when using the inventive mass spectrometer, however, because the elevated electrical potential driving extraction/acceleration is imparted to first focusing element 58 rather than sample holder 50. With this approach, extraction/acceleration is essentially unaffected by variations in electrical potential at localized regions in the sample holder. Therefore, better quality spectra can be generated, leading to better analysis accuracy, since the results of analysis from region to region on the sample holder are essentially the same.

The inventive mass spectrometer can be used in carrying out a wide variety of different analyses. Most commonly, the inventive mass spectrometer will be used for analyzing compounds of biological interest such as DNA, RNA, polynucleotides, peptides, proteins, PNA, carbohydrates, glycocoajugates and glycoproteins. The inventive mass spectrometer can also be used in carrying out analysis of synthetic polymers. Normally, a matrix substance will be admixed with the sample for facilitating absorption of the laser or other energy used for desorption/ionization.

A particular advantage of the present invention is that protein analysis can be carried out directly on the gel sheet or other membrane used for physical separation of the proteins rather than on individual samples separately extracted from this gel sheet or membrane. In current protein analysis, for example, a drug to be tested is injected into living cells which are then grown in a medium such as albumen or the like. The proteins produced are then extracted from this mixture with a liquid and physically separated from one another by contact with a gel or other adsorption medium. Each individual protein must then be separately extracted from the gel sheet or other medium and a separate sample individually prepared from the extracted protein. Since hundreds and even thousands of different proteins can be produced, separate preparation of individual samples from each protein is very time consuming and expensive.

In accordance with another aspect of the present invention, separate preparation of individual samples can be eliminated since the gel sheet or other separation medium itself can serve as the target for mass spectrometric analysis. Because extraction/acceleration in accordance with the present invention is carried out by an electric field remote from the sample, inaccuracies due to variation in electrical conductivity of the sample have less effect on the analytical results achieved. Accordingly, the gel sheet or other separation membrane used for physical separation of the proteins can be directly used as the target, thereby eliminating the need for separate sample preparation.

WORKING EXAMPLES

In order to more thoroughly describe the present invention, the following working examples are provided.

Equipment

Figure 5:
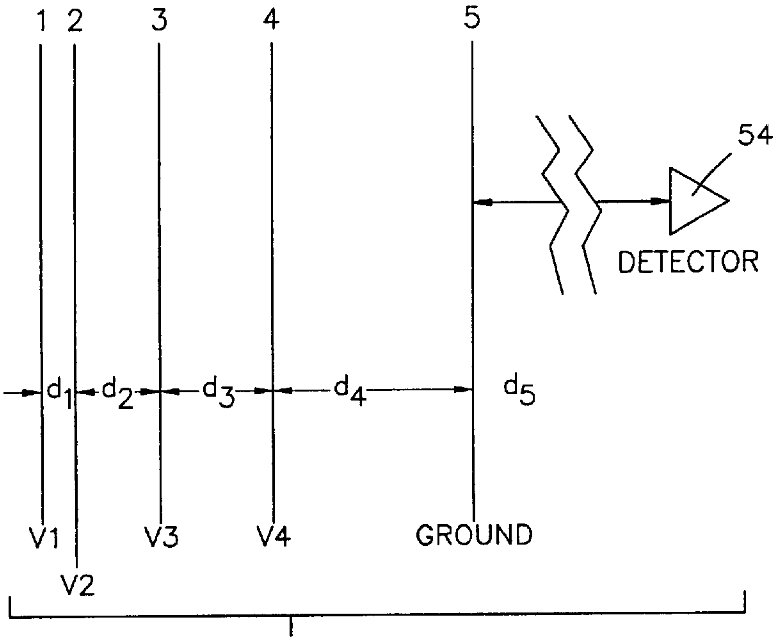
FIG. 5 is a schematic illustration similar to FIGS. 3 and 4 illustrating the mass spectrometer used in some of the working examples of the present invention described below.

A linear MALDI-TOF mass spectrometer embodying the SDIFA technology of this invention was constructed in accordance with the schematic diagram of FIG. 5. The spaces between the plates were 0.05, 0.1, 0.25, and 0.75 inch, respectively. The free-field drift tube length was ~39.5 inches. Ceramic spacers isolated the plates from each other. The sample holder carrying the sample was inserted into the central hole of the sample holder plate. The sample holder surface was flush with the surface of the sample holder plate. The working pressure of the vacuum system was better than $7\times10^{-7}$ Torr.

An approach similar to that used by Brown's group was employed to build the high-voltage pulse system. See, R. S. Brown and J. J. Lennon, *Anal. Chem.* 67, 1998 (1995). A 30 kV isolation transformer provided a floated 110V AC power for a pulse switch (PVM-4150, Directed Energy, Inc., Fort Collins, Colo.) and an auxiliary power supply. All components (except the bias power supply) were in an electrically isolated enclosure. A bias voltage (0–18 kV) served as the ground reference for all components. The pulse switch triggered via fiber-optic cable to generate a 0–1.5 kV pulse with a rising time of ~55 ns. A digital delay/pulse generator was used to control the timing of the system.

A pulsed Nd:YAG laser producing a wavelength of 355 nm was used for MALDI. A group of glass plates was placed in the laser beam for variable attenuation, allowing adjustment of the laser energy. The laser beam at an incident angle of 45° was forced on the sample tip with a lens which was mounted on a three-dimensional translation stage, allowing scanning of the laser across the surface of the sample tip to search for "sweet" spots. A deflector was used to deflect away low-mass ions to minimize detector saturation. An MCP detector (R. M. Jordan Company, Grass Valley, Calif.) was used to detect the ions. The ion signal was recorded using a Tektronix 520 digital oscilloscope and the resulting spectra were processed and analyzed by a Grams/32 program (Galactic, Salem, N.H.). Unless specified, all spectra were collected with positive-ion detection.

Materials and Sample Preparation

Synthetic DNA of 41 and 62mers was obtained from National Biosciences, Inc. (Plymouth, N.H.). The 25mer was obtained from PerSeptive Biosystems. Other materials were obtained from Aldrich (Milwaukee, Wis.). All samples were used without further purification.

Mini sequencing products were prepared using synthetic DNA templates containing A or T on the second base of codon 12 of the K-ras gene. Two mini sequencing primers of 16 and 23mers were used to target the variation site. The pinpoint approach was used for mini sequencing and produced extended primers of 17 and 24 bases in length, respectively. See, L. A. Haff and I. P. Smirnov, *Genome Research*, Vol. 7, Page 378, 1997. It should be noted that although the SNP probes used were biotinated, mini sequencing products were purified using ethanol precipitation and ion-exchange rather than using the magnetic bead method. See, C. Tong and L. M. Smith, *Anal. Chem.*, Vol. 64, Page 2672, 1992.

The MALDI sample was prepared by mixing 0.5 μL of synthetic oligonucleotides or purified mini sequencing products and 0.5 μL matrix (saturated 3-hydropicolinic acid in a 1:1:2 mixture of water, acetonitrile and 0.1M ammonium citrate) on the sample probe. The sample was dried in air before being inserted into the vacuum chamber. Unless specified, a stainless steel probe was used. A Teflon probe was prepared using the procedure reported earlier. See, K. Hung, H. Ding and B. C. Guo, *Anal. Chem.*, 71, 132 (1999).

RESULTS

Figure 6:
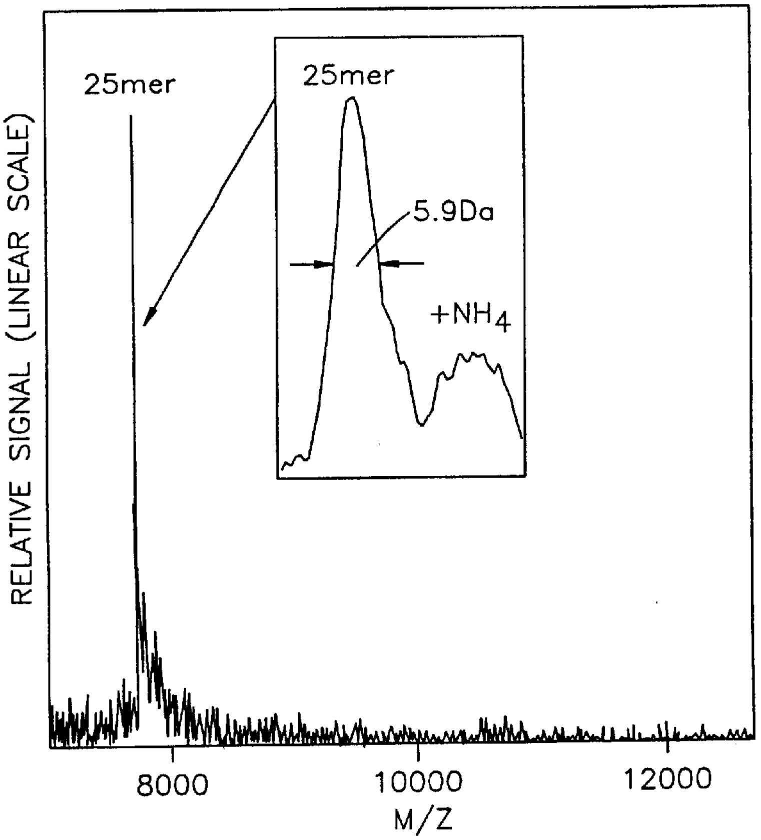
FIGS. 6 and 7 display mass spectrums of a 25mer and a 41mer, respectively, produced in working examples of the present invention using the mass spectrometer of FIG. 5.

FIG. 6 displays a mass spectrum of a 25mer obtained with the mass spectrometer described above operated under the following conditions:

$V_1=V_3=17.9$ kV;

$V_2=17.9$ kV pulsing to 18.36 kV $V_4=16.75$ kV;

$V_5=0$ V; and

Delay Time=3.5 μs where $V_5$ represent the voltage of the ground plate. The minor peaks appeared in the spectrum correspond to $NH_4^+$ adducts. It was seen that the peak width (FWHM) of this 25mer was $\Delta m=5.9$ Da, corresponding to a resolution of about 1300. Computing simulations, including both instrumental resolution and the isotopic pattern of this 25mer, revealed that this observed resolution was limited by the width of the isotope distribution and that it can only be attained with an instrumental resolution of 1700. In other words, the true instrumental resolution was, as a matter of fact, better than 1300 for this 25mer. Note that the true instrumental resolution is defined as the attainable resolution if there was no isotopic distribution.

Figure 7:
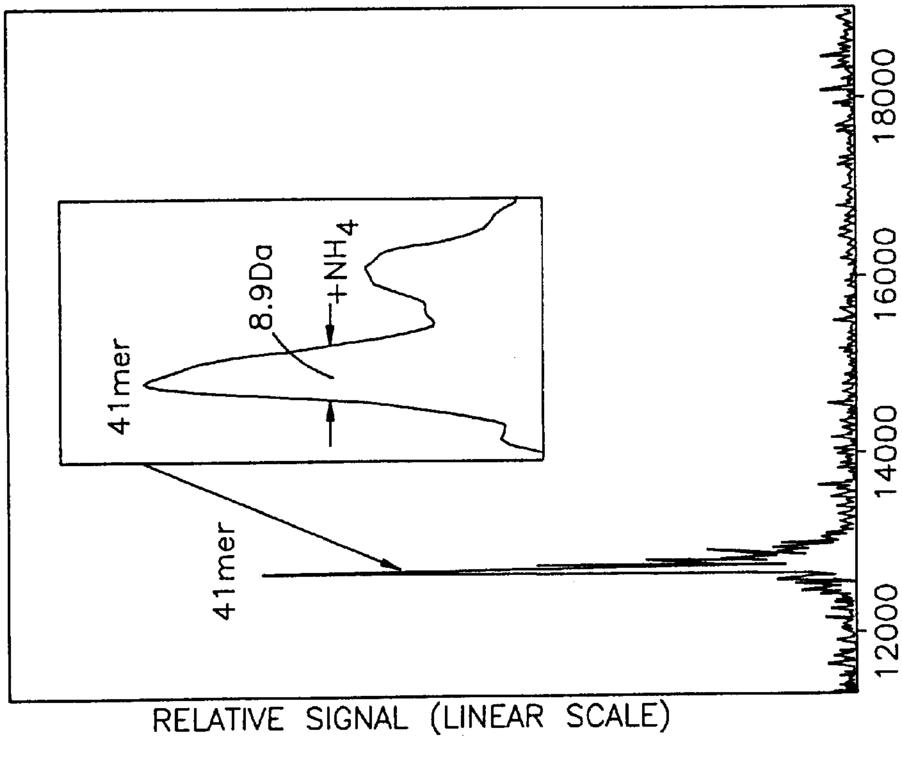

FIG. 7 displays a mass spectrum of a 41mer obtained with the mass spectrometer described above operated under the following conditions:

$V_1=V_3=18.0$ kV;

$V_2=18.0$ kV pulsing to 18.51 kV $V_4=16.62$ kV;

$V_5=0$ V; and

Delay Time=3.7 μs.

As shown in this figure, the peak width of this molecule (FWHM) was $\Delta m=8.9$ Da, corresponding to a resolution of about 1400. Computing simulations revealed that this observed resolution was also limited by the width of the isotope distribution and that the true instrumental resolution was better than 1700.

Figure 8:
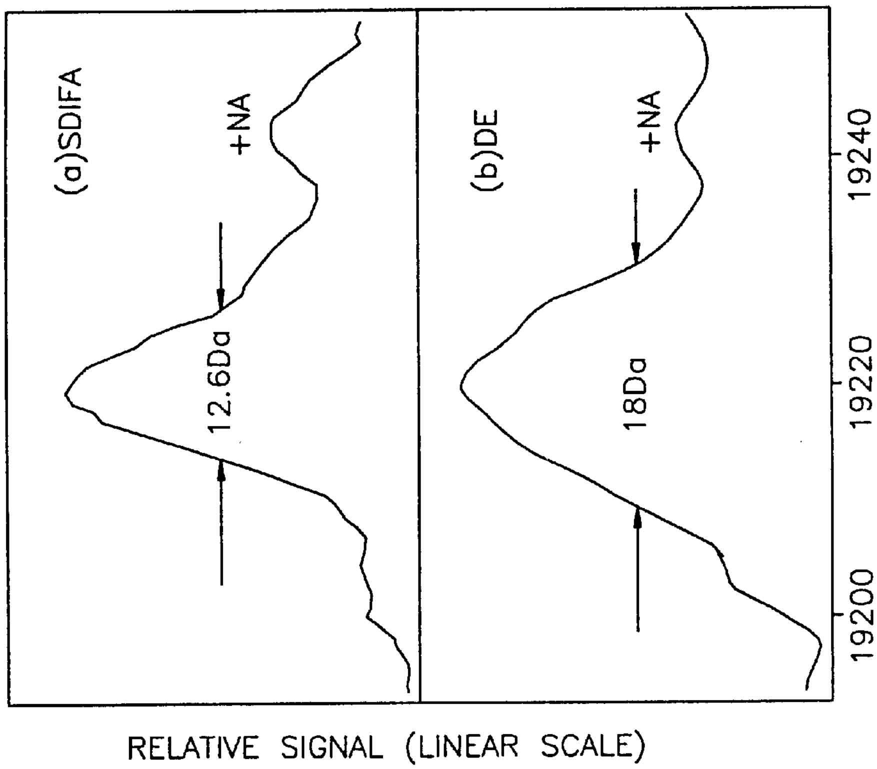
FIG. 8*a* is similar to FIGS. 6 and 7 in that it displays the mass spectrum of a 62mer produced by the inventive mass spectrometer of FIG. 5.
FIG. 8*b* is similar to FIG. 8*a*, except that FIG. 8*b* displays the mass spectrum of a 62mer produced by the mass spectrometer of FIG. 5 modified to practice conventional delayed extraction MALDI-TOF.

The third oligonucleotide examined was a 62mer and its spectrum obtained with the above mass spectrometer, operated under the following conditions, is shown in FIG. 8A:

$V_1=V_3=17.9$ kV;

$V_2=17.9$ kV pulsing to 18.36 kV $V_4=16.75$ kV;

$V_5=0$ V; and

Delay Time=3.5 μs

The minor peak appearing in the spectrum corresponds to $Na^+$ adduct. The peak width (FWHM) of this 62mer in FIG. 8A was $\Delta m=12.6$ Da, corresponding to a resolution of about 1500. Computing simulations revealed that this observed resolution was also limited by the width of the isotope distribution and that it is only attained if the true instrumental resolution is better than 1800.

For comparison, the mass spectrometer of FIG. 5 was reconfigured into a conventional delayed extraction system that utilized the geometry similar to that used in PerSeptive Biosystems' Voyager-DE system. See, U. Bahr, J. Stahl-Zeng, E. Gleitsann and M. Karas, *J. Mass Spectrom*, 32, 1111 (1997). FIG. 8B shows the best spectrum obtained when the same 62mer was analyzed under the DE configuration at the following conditions:

$V_1=17.44$ kV pulsing to 18.50 kV;

$V_2=17{,}44$ kV $V_3=0$ V; and

Delay Time=0.98 μs

Other hardware parts, including the high-voltage pulser, electronics and ion detection systems, were the same as those used in SDIFA. In addition, the total acceleration voltage was similar to that used in SDIFA as well. The extraction filed was established by applying a pulsed voltage to the sample holder. It was seen that a peak width of 18 Da, corresponding to a resolution of about 1070 was attained with DE. Computing simulations revealed that this observed resolution was not limited by the isotope distribution. In other words, the observed resolution reflects the true instrumental resolution. Comparing this result with Lubman's work reported in Y. Zhu, L. He, J. R. Srinivasan and D. M. Lubman, *Rapid Commun. Mass Spectrom*, 11, 987 (1997) in which a resolution of 520 was produced for a 60mer using DE, it is believed that the ultimate performance of the DE-MALDI-TOF system has been achieved for this 62mer. Clearly, this result demonstrates that the true instrumental resolution of SDIFA is much better than that of conventional DE for this 62mer.

One of the important features of the SDIFA is that well-resolved spectra are obtained virtually from all desorption spots that yield good DNA ion signals. In other words, the performance of the instrument is less sensitive to desorption spots. This feature is very useful in automated spectrum acquisition that is essential to large-scale analysis of biomolecules. In addition, it appears that the performance of SDIFA is also less sensitive to the laser power used.

Another important feature of SDIFA is that ultimate or near-ultimate performance is attained with many different settings of the voltages and the delay times. For instance, if the extraction voltage increases by about 20V from the optimum setting, a small decrease of the delay time will virtually restore the performance. In addition, ultimate or near-ultimate resolution can be obtained for oligonucleotides of many different sizes with SDIFA by simply varying the delay time while fixing the voltages. This indicates that high-resolution mass spectra across a very large mass range can be obtained simply by varying the delay time of the extraction field.

Compared with conventional DE, SDIFA utilizes a much smaller increase in extraction voltage. For example, an extraction voltage as low as 600V can be used in SDIFA to achieve ultimate resolution for the 62mer. In contrast, a pulse of 1200V was required to generate good-quality spectra for the same oligonucleotide in DE. This feature is important to building a better pulse generator. In general, it is easier to produce a faster rising pulse if the pulsed voltage is small and the faster rising extraction pulse yields a better mass resolution.

Many applications, including multiplex genotyping of SNPs with the pinpoint assays, require the very best resolution to resolve a number of the heterozygote samples of different size across a large mass range. In conventional delayed extraction MALDI-TOF, ultimate resolution is attained only in a narrow mass range in DE. See, M. L. Vestal, P. Juhasz and S. Martin, *Rapid Commun. Mass Spectrom*, 9, 1044 (1995); P. Juhasz, M. T. Roskey, I. P.

Smirnov, L. A. Haff, M. L. Vestal and S. A. Martin, *Anal. Chem.*, 68, 941 (1996). Hence, the performance of SDIFA in analysis of multiple genotyping products was examined in the mass range of 5200–7800 Da using a single setting of the extraction filed strength and the extraction delay time. This mass range was selected on the basis of the consideration that most of the extension products produced from pinpoint assays will have molecular weights between 5200 and 7800 Da.

Figure 9A:
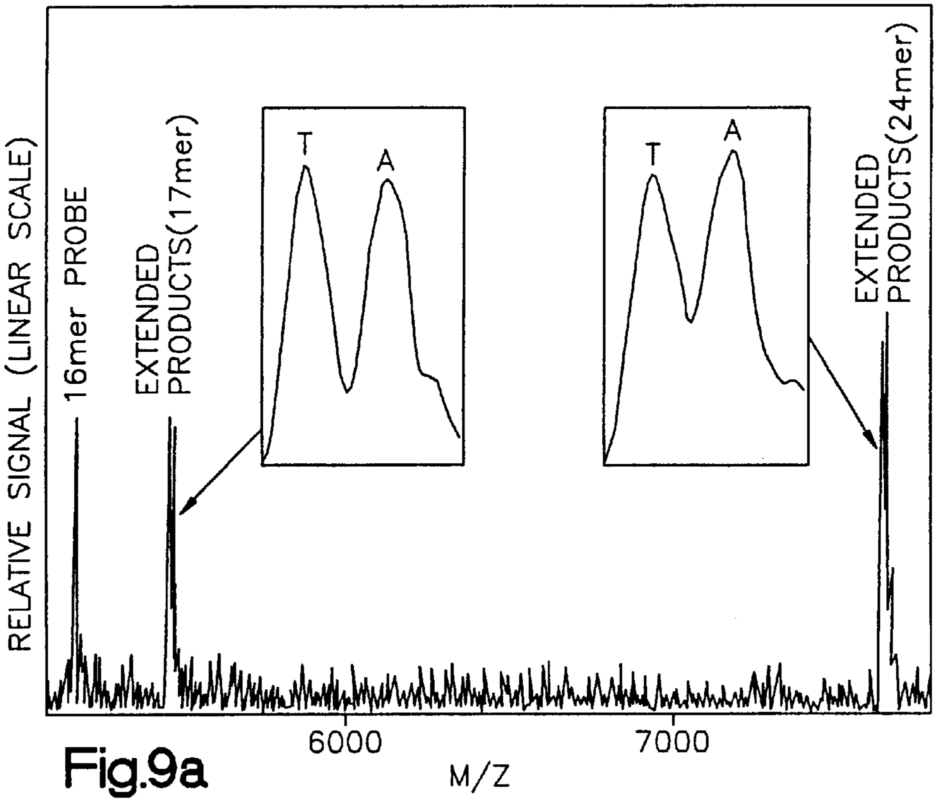
FIG. 9*a* illustrates the ability of the inventive SDIFA technology to provide high accuracy resolution across a broad mass range.

FIG. 9*a* displays a spectrum of the products extended from probes of 16 and 23mers by the addition of ddT and ddA. The SDIFA settings used to obtain this spectrum are as follows:

$V_1=V_3=17.9$ kV;

$V_2=17.9$ kV pulsing to 18.485 kV $V_4=16.72$ kV;

$V_5=0$ V; and

Delay Time=3.4 μs

In this study, the SDIFA focusing condition was set to attain the very best resolution for the larger component. It was found that this focusing condition led to near-ultimate resolution for the smaller components as well. More importantly, clear separation of the A/T hereozygote was achieved for both smaller and larger components using this SDIFA condition. It was seen that a mass resolution (Δm) of less than 7 Da was obtained across this mass range.

Figure 9B:
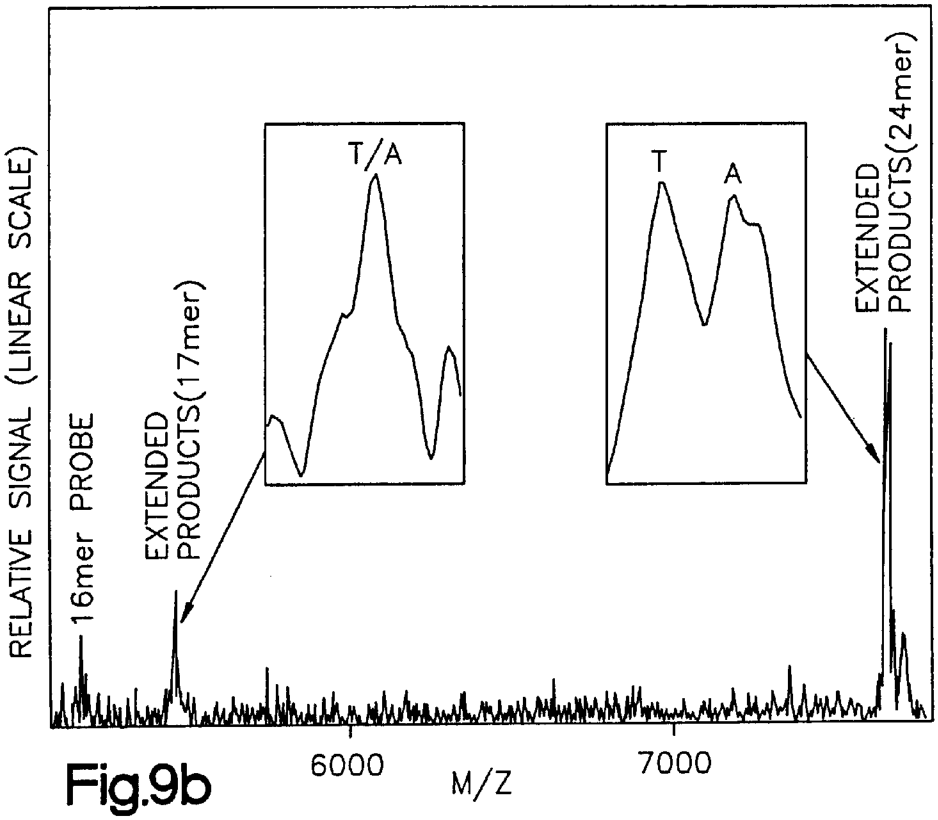
FIGS. 9*b* and 9*c* are provided for comparative purposes and show that conventional delayed extraction MALDI-TOF technology cannot achieve high resolution across a broad mass range.
Figure 9C:
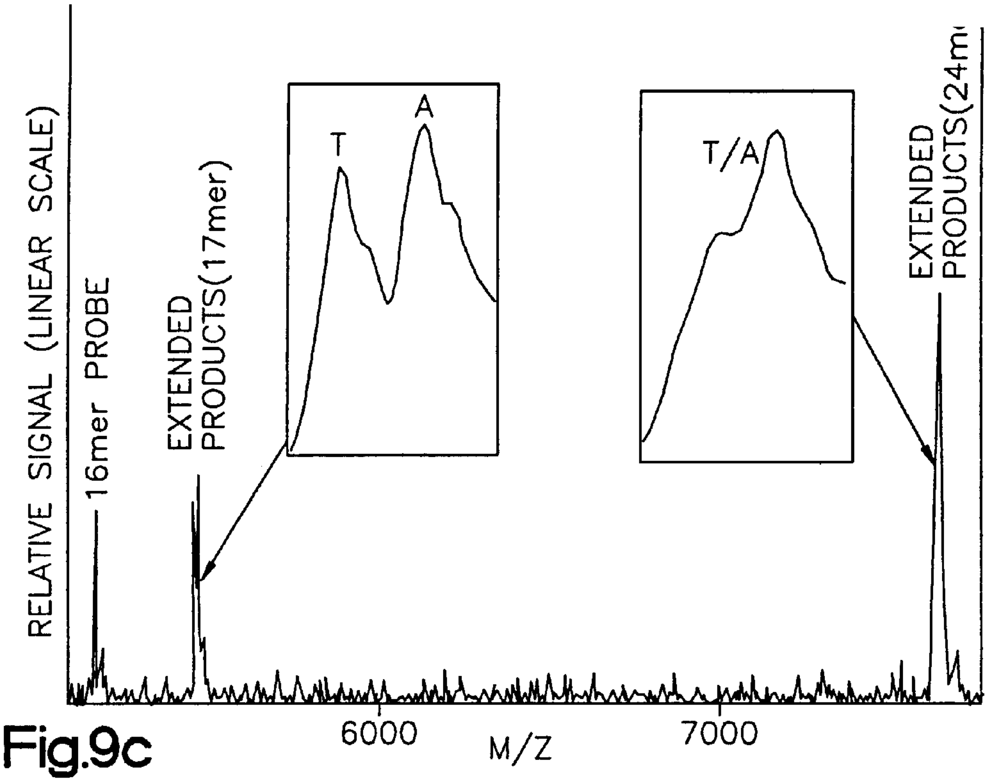

For comparison, the spectra of the same sample using the DE configuration were also recorded. FIG. 9*b* shows the result obtained by focusing the larger component in DE. It was seen that the large component was resolved and its resolution was comparable to that in FIG. 9*a*. However, the smaller component was poorly resolved. FIG. 9*c* shows the results obtained by focusing the smaller component. The smaller component was resolved, but the larger component became poorly resolved. The conditions used for these tests were as follows:

| Figure 9b | Figure 9c |
|---|---|
| $V_1$ = 17.44 kV pulsing to 18.49 kV; | $V_1$ = 17.46 kV pulsing to 18.49 kV; |
| $V_2$ = 17,44 kV | $V_2$ = 17,46 kV |
| $V_3$ = 0 V; and | $V_3$ = 0 V; and |
| Delay Time = 1.2 μs | Delay Time = 1.1 μs |

This comparison indicates that compared with DE, SDIFA can achieve a better resolution across a larger mass range. This is another important feature of SDIFA.

Figure 10:
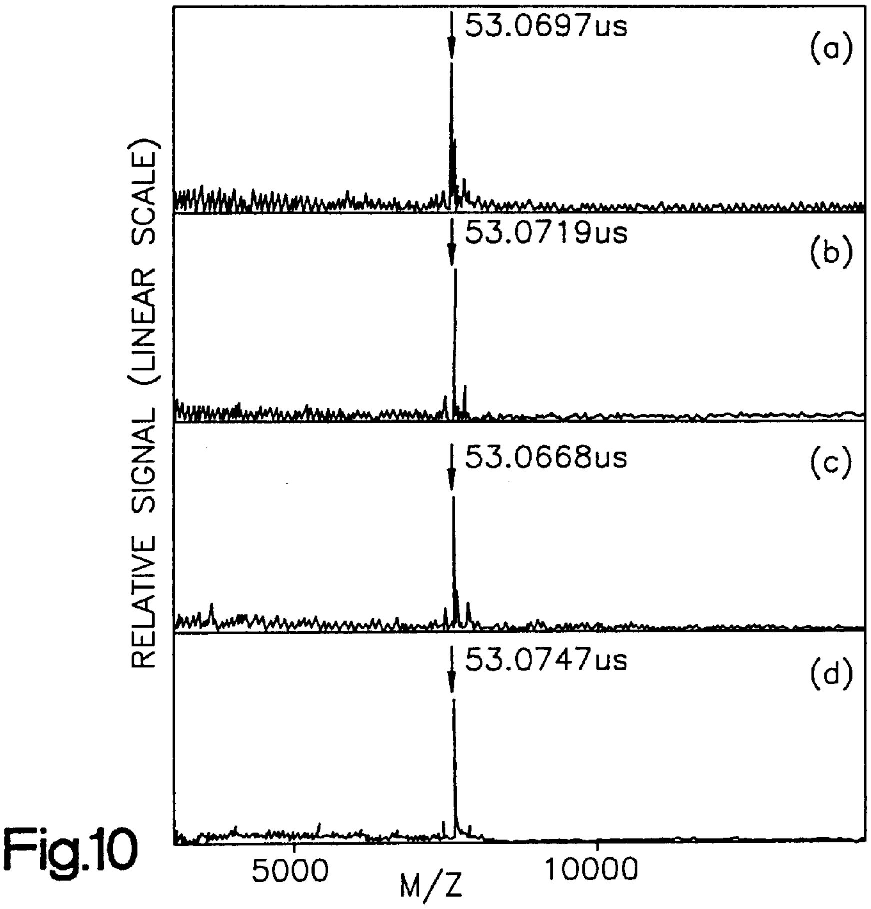
FIG. 10 illustrates the ability of the inventive SDIFA technology to eliminate spot to spot variations in the analysis of samples mounted on dielectric substrates.

Recently, it has been found that use of dielectric substrates improves the performance of MALDI-TOF in DNA analysis. However, the problem with dielectric substrates is that internal calibration standards must be added for calibration purposes because of large peak position variations from spot to spot. Therefore, an experiment was conducted to determine whether SDIFA could eliminate this peak position variation problem. A Teflon® substrate was used in this study. A number of DNA samples was prepared and deposited on the Teflon® surface. The spectra from at least four different spots of each sample was then collected. FIG. 10 displays the spectra of a DNA 25mer obtained from four different spots of a same sample. The conditions of this test were as follows:

$V_1=V_3=17.9$ kV;

$V_2=17.9$ kV pulsing to 18.485 kV $V_4=16.72$ kV;

$V_5=0$ V; and

Delay Time=3.6 μs

For all the samples tested, the largest peak variation observed was about 7 Da (less than 0.1%) for this 25mer and this variation value was similar to that observed using a stainless steel sample substrate. This small peak position variation might be caused by the experimental procedure in which the sample target was fixed and the laser position changed to search for the sweet spots. As a result, the ions produced from different spots were subjected to different flight paths, thereby leading to different flight times. It should be pointed out that the resolution attained with the Teflon® substrate was similar to that obtained by using metal substrates, but the detection sensitivity with Teflon® was better.

Figure 11:
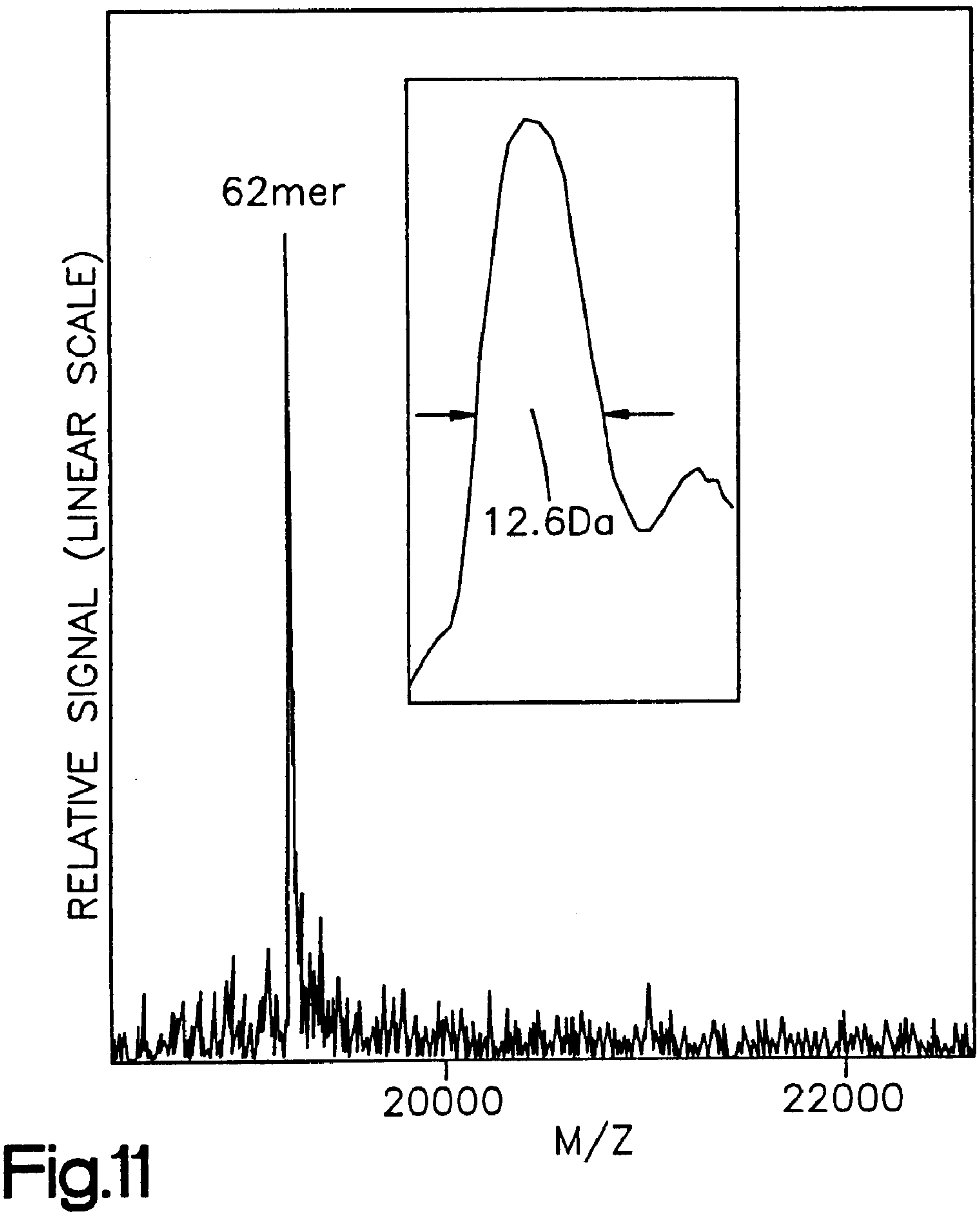
FIG. 11 is similar to FIG. 6 except that it displays the mass spectrum of a 62mer produced using negative ion detection rather than positive ion detection as in the case of the other results reported above.

Finally it should be noted that, although the above results were generated with positive-ion detection, the inventive SDIFA technology can be used to generate excellent results using negative-ion detection as well. This is illustrated in FIG. 11, for example, which shows the mass spectrum obtained from the analysis of a 62mer using the system of FIG. 5 configured to operate in the negative ion detection mode under the following conditions:

$V_1=V_3=17.8$ kV;

$V_2=-17.9$ kV pulsing to 18.49 kV $V_4=-17.35$ kV;

$V_5=0$ V; and

Delay Time=3.7 μs.

From this figure, it can be seen that the inventive SDIFA technology, when practiced with negative ion detection, provides the same excellent results as when positive ion detection is used.

Although only a few embodiments of the present invention have been described above, it should be appreciated that many modifications can be made without departing from the spirit and scope of the invention. For example, although the above disclosure predominantly refers to matrix assisted desorption ionization time of flight mass spectroscopy, samples to be analyzed in accordance with the present invention need not be mixed with a matrix chemical if desired. Similarly, although the above disclosure indicates that the electrical potentials of the sample holder and the various focusing elements are provided by a single power system, in actual practice multiple power sources and associated control systems will typically be employed in accordance with conventional practice. See U.S. Pat. No. 5,760,393 mentioned above. Also, although the details of the structure and operating control programs of the inventive mass spectrometer have not been set forth above, they can be easily determined by a person of ordinary skill in the art based on the above description. All such modifications and details are intended to included within the scope of the present invention, which is to be limited only by the following claims.

We claim:

1. A mass spectrometer for carrying out desorption-ionization time-of-flight mass spectrometry in which a detector senses ions produced by pulsed ionization and desorption of a sample, wherein the mass spectrometer includes a first focusing element and a power source capable of elevating the electrical potential of the first focusing element to a higher electrical potential than the sample a predetermined time after pulsed ionization and desorption thereby creating (a) a rejection electrical field preventing a first portion of the ions from reaching the detector and (b) an acceleration electric field accelerating a second portion of the ions towards the detector.

2. The mass spectrometer of claim 1, wherein the mass spectrometer further includes a sample holder, an ionization source for ionizing a portion of the sample, and second and reference focusing elements arranged successively between the sample holder and the detector, and further wherein the power system is capable of applying a first electrical potential to the first focusing element at a predetermined time after ionization of the sample, the first electrical potential comprising said higher electrical potential, the first electrical potential preventing ions in the region between the sample holder and the first focusing element from reaching the detector.

3. The mass spectrometer of claim 1, wherein the power system is further adapted to apply a sample electrical potential to the sample holder and a second electrical potential to the second focusing element.

4. The mass spectrometer of claim 3, wherein during an extraction/ionization phase of operation the power system is adapted to apply essentially the same electrical potential to the sample, the first focusing element and the second focusing element, and further wherein during an acceleration phase of operation the power system is adapted to increase the electrical potential applied to the first focusing element.

5. The mass spectrometer of claim 4, wherein during the acceleration phase of operation the sample electrical potential and the second electrical potential are maintained essentially the same.

6. The mass spectrometer of claim 4, further comprising a third focusing element between the second focusing element and the reference focusing element, the power system being adapted to apply a third electrical potential to the third focusing element during the acceleration phase, the third electrical potential being less than the sample electrical potential.

7. The mass spectrometer of claim 6, wherein the third electrical potential achieves an essentially uniform electrical field strength between the first and third focusing elements during the acceleration phase.

8. The mass spectrometer of claim 5, wherein the reference focusing element is maintained at essentially ground potential.

9. The mass spectrometer of claim 3, wherein the power system is controlled so that the sample electrical potential, the first electrical potential and the second electrical potential are essentially the same during an ionization/desorption phase of operation, after which the sample electrical potential and the second electrical potential are maintained at an essentially common electrical potential but the first electrical potential is changed such that the absolute value of the first electrical potential is greater than the absolute value of the essentially common electrical voltage.

10. The mass spectrometer of claim 9, wherein the acceleration phase begins only after a significant portion of the ion plume passes the second focusing element toward the detector.

11. The mass spectrometer of claim 10, wherein the acceleration phase begins no earlier than about 2.5 microseconds after production of the ion plume.

12. The mass spectrometer of claim 11, further comprising a reference focusing element between the second focusing element and the detector.

13. The mass spectrometer of claim 12, wherein the electrical potential of the reference focusing element is ground.

14. The mass spectrometer of claim 11, further comprising a third focusing element between the second focusing element and the detector, the third focusing element having an electrical potential different from the detector.

15. The mass spectrometer of claim 14, wherein the power system is adapted to apply a sample electrical potential to the sample, a second electrical potential to the second focusing element and a third electrical potential to the third focusing element.

16. The mass spectrometer of claim 15, wherein the power system is controlled so that during an ionization/desorption phase of operation, the sample electrical potential, the first electrical potential and the second electrical potential are essentially the same but the third electrical potential is less than the second electrical potential, and further wherein during an acceleration phase of operation, the sample electrical potential and the second electrical potential remain essentially the same but the first electrical potential is changed relative to the sample electrical potential and the second electrical potential during an acceleration phase of operation.

17. The mass spectrometer of claim 16, wherein the sample electrical potential and the second electrical potential remain essentially equal and essentially constant during both the ionization/desorption phase and the acceleration phase.

18. The mass spectrometer of claim 16, wherein the acceleration phase begins only after a substantial portion of the ion plume has passed the second focusing element toward the detector.

19. The mass spectrometer of claim 18, wherein the acceleration phase begins no earlier than about 2.5 microseconds after production of the ion plume.

20. The mass spectrometer of claim 1, wherein the ionization system is a pulsed ionization system and further wherein the power system applies a pulsed electrical potential to the first focusing element at a predetermined time after the ionization pulse from the pulsed ionization system.

21. The mass spectrometer of claim 20, wherein the ionization system is a pulsed laser.

22. The mass spectrometer of claim 20, further comprising a control system for controlling the operation of the power system, the control system being adapted to apply a pulsed voltage increase to the first focusing element a predetermined time after ionization of the sample.

23. The mass spectrometer of claim 22, wherein during an ionization/desorption phase of operation the control system is adapted to maintain the sample holder, the first focusing element and the second focusing element at essentially the same electrical potential, and further wherein during an acceleration phase of operation the control system is adapted to cause a pulsed voltage increase to be applied to the first focusing element.

24. The mass spectrometer of claim 23, wherein pulsed ionization of the sample produces a plume of sample ions which expands from the sample holder towards the detector, the control system causing application of a pulsed electrical potential increase to the first focusing element after a substantial portion of the ion plume has passed into the second focusing region.

25. The mass spectrometer of claim 24, wherein application of a pulsed electrical potential increase to the first focusing element marks the beginning of the acceleration phase, the acceleration phase beginning no earlier than about 2.5 microseconds after production of the ion plume.

26. The mass spectrometer of claim 24, wherein pulsed ionization of the sample produces a plume of sample ions which expands from the sample holder towards the detector, the control system causing application of a pulsed increase in electrical potential to the first focusing element only after a significant portion of the ion plume has passed the second focusing element.

27. A mass spectrometer for carrying out desorption-ionization time-of-flight mass spectrometry in which pulsed ionization of a sample creates a plume of ions which expands towards a detector, wherein the mass spectrometer includes a first focusing element, a second focusing element maintained at essentially the same electrical potential as the sample, a power system for applying a pulse of increased electrical potential to the first focusing element, and a control system for triggering the power system so that, when a pulse of increased electrical potential is applied to the first focusing element, the ion plume is divided by the first and second focusing elements into a region of slow moving ions, a region of fast moving ions and a region of intermediate velocity ions, wherein the slow moving ions are prevented from reaching the detector at all while the fast moving ions reach the detector only as background noise.

28. A process for enhancing the resolution of a desorption-ionization time-of-flight mass spectrometer comprising applying an increased electrical potential to a first focusing element spaced apart from the sample being analyzed after a substantial portion of the ion plume created by sample ionization passes the first focusing element towards the detector of the spectrometer, the increased electrical potential being greater than the electrical potential of the sample so that ions of the plume not having reached the first focusing element when the increased electrical potential is applied are prevented from passing the first focusing element by the increased electrical potential.

29. The process of claim 28, wherein the increased electrical potential is applied to the first focusing element no earlier than about 2.5 microseconds after sample ionization.

30. A process for enhancing the resolution of a desorption-ionization time-of-flight mass spectrometer comprising preventing a portion of the ions produced by sample ionization from reaching the detector of the spectrometer by applying a first electrical potential to a first focusing element spaced apart from the sample being analyzed, the first electrical potential being greater than the electrical potential of the sample.

31. The process of claim 30, wherein ionization of the sample creates an ion plume which moves from the sample towards the detector of the mass spectrometer, the process further comprising dividing the ion plume into a region of slow moving ions, a region of fast moving ions and a region of intermediate velocity ions, and disregarding the slow moving ions and the fast moving ions in determining the analysis of the sample.

32. The process of claim 31, wherein the slow moving ions are disregarded by preventing the slow moving ions from reaching the detector and further wherein the fast moving ions are disregarded by treating the fast-moving ions sensed by the detector as background noise.

* * * * *